United States Patent [19]

Karlsson et al.

[11] Patent Number: 4,771,421
[45] Date of Patent: Sep. 13, 1988

[54] APPARATUS FOR RECEIVING HIGH-SPEED DATA IN PACKET FORM

[75] Inventors: Roland V. Karlsson, Stockholm; Billy C. I. Jagborn, Vallentuna, both of Sweden

[73] Assignee: Telefonaktiebolaget LM Ericsson, Stockholm, Sweden

[21] Appl. No.: 883,549

[22] Filed: Jul. 9, 1986

Related U.S. Application Data

[63] Continuation-in-part of Ser. No. 621,919, Jun. 13, 1984, abandoned.

[30] Foreign Application Priority Data

Nov. 10, 1982 [SE] Sweden .................................. 8206387

[51] Int. Cl.⁴ ........................... H04J 3/02; H04B 1/10
[52] U.S. Cl. ........................................ 370/85; 370/94; 377/39; 375/102
[58] Field of Search ...................... 370/85, 60, 94, 108; 375/102, 40; 371/36, 68; 377/39

[56] References Cited

.U.S. PATENT DOCUMENTS

| | | | |
|---|---|---|---|
| 3,783,250 | 1/1974 | Fletcher et al. | 371/36 |
| 4,088,833 | 5/1978 | Godard et al. | 375/102 |
| 4,225,961 | 9/1980 | Raggenbass et al. | 371/36 |

Primary Examiner—Douglas W. Olms
Assistant Examiner—Frank M. Scutch, III
Attorney, Agent, or Firm—Roberts, Spiecens & Cohen

[57] ABSTRACT

Apparatus for asynchronous reception of high-speed data in packet form in a receiver in a telecommunication system where transmitter and receiver are in communication in selected time slots over a common bus. The apparatus includes a delay line (7) receiving the incoming signal and having a plurality of taps, each of which feeds the signal to its own shift register. A locking circuit (10) is furthermore arranged, which stops the stepping forward in the shift register when the first "one" therein has come to a given position, and counting means (12) which senses this given position in each shift register and sums the sensed "ones". A comparison circuit (14) compares the obtained sum with a value constituting the criterion for the number of sensed "ones" representing a received "one".

4 Claims, 1 Drawing Sheet

APPARATUS FOR RECEIVING HIGH-SPEED DATA IN PACKET FORM

This application is a continuation-in-part of application Ser. No. 621,919 filed June 13, 1984, now abandoned.

BACKGROUND ART

A telecommunication system with high data transmission speed and where data is sent in packets with certain time intervals between the packets, e.g. a system operating with optical signals, necessitates special measures for enabling comprehension and recognition of the value of the bit (a one or a zero) being received. In an optical telecommunication system, e.g. that described in the report "COST 202 Seminar", September 1981, the transmission speed is 100 Mbits/s, implying that the pulse length is 10 ns. Conventional methods in the reception of high speed packets arriving at certain intervals requires clock supervision, which presupposes special coding and associated bandwith loss.

DISCLOSURE OF INVENTION

The basic idea of the invention is to provide an apparatus enabling sensing and storing of high-speed packets for subsequent reconstruction by a majority decision process.

More particularly, the invention contemplates apparatus for detecting the binary value of pulse shaped signals which utilize a delay line for receiving the pulse shaped signals with the delay line having P equispaced taps. Each of P shift registers has an input connected to a different one of the taps as well as a stepping input and output. A clock pulse source generates clock pulses to the stepping input of a different one of said shift registers. Each of a plurality of logic means is responsive to the presence of a one-bit at the output of a different shift register for activating the control means associated with the shift register. Sampling means has P inputs connected respectively to the outputs of the P shift registers for giving an indication of a particular binary value when more than a predetermined number of outputs of the P shift registers show a one-bit value.

DESCRIPTION OF FIGURES

The presently preferred embodiment of the invention will now be described in detail with reference to the appended drawing, on which.

PREFERRED EMBODIMENT

Figure 1:
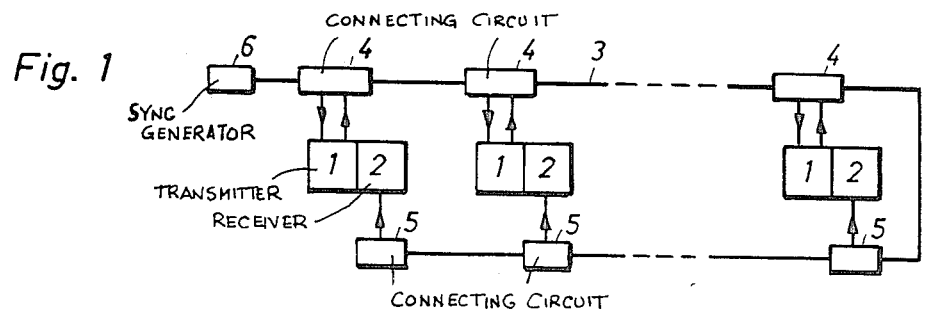
FIG. 1 is a block diagram of a digital communication system.

FIG. 1 schematically illustrates an optical telecommunication system having a plurality of terminals, e.g. 100 terminals, each of which is provided with a transmitter 1 and a receiver 2. All transmitters and receivers are connected to a common bus line 3 via connecting circuits 4 and 5, which convert optical signals to electrical signals and vice versa, respectively. A sync generator 6 sends synchronizing signals over the common bus so that they are available for all transmitters and receivers. Transmission on the bus takes place at a rate of 100 Mbits/s and the frame is formed by 100 time slots, each corresponding to a receiver and are marked by the synchronizing bits. Each receiver is opened for the reception of data information with the aid of its clock in its reference position, which is a definite interval before the synchronizing bit, and the transmitter selects the time slot corresponding to the desired receiver. During this time slot, which has a length of 32 bits, a data packet of 16 bits is sent in the middle of the time slot. Each time slot begins with a synchronizing bit, and where a transmitter sends information to the receiver associated with the time slot, the data packet follows 8 bits later on. No data packet follows in the opposite case.

Figure 2:
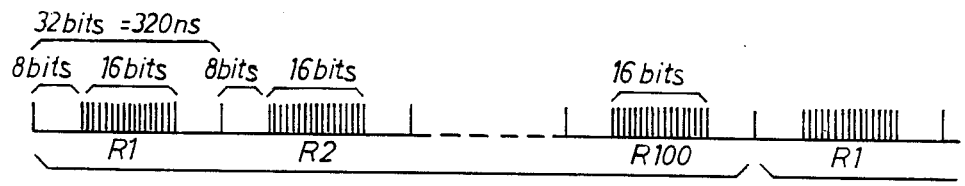
FIG. 2 is a signal diagram illustrating the shape of the signals in signalling between a sender and a receiver.

The signal diagram is illustrated in FIG. 2. The above mentioned telecommunication system is described in the conference minutes from the COST 202 Seminar, September 1981, and is not the subject of the invention.

Figure 3:
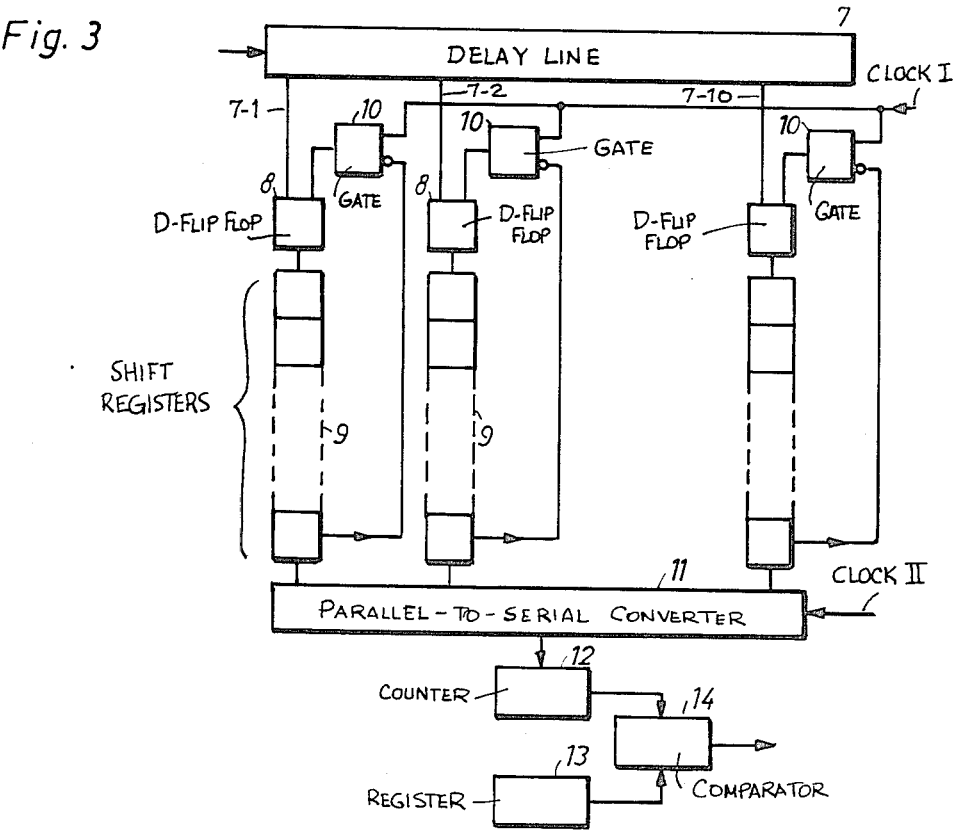
FIG. 3 is a circuit diagram of the invention.

In a telecommunication system of the aforementioned type, it is difficult to sense data signals with conventional means. The receiver must detect that the sync signal has arrived and it must also be able to identify the contents of the data packet with respect to the bits, i.e., ones and zeros. This can be performed with the aid of an apparatus in accordance with the invention and which is illustrated in FIG. 3. The signals coming in over the bus line are fed to a delay line 7, which has 10 taps 7-1 to 7-10 according to the embodiment. (Conversion of the optical signals to electrical signals is performed in known manner, and therefore only processing of the signals received and converted to electrical signals is explained here.) The time period between the signals fed out over two adjacent taps is 1 ns in the example. The ten output signals from the delay line 7 are each fed to its respective D-flipflop 8, the flipflops being controlled by a common clock ( clock I) the phase of which is independent of incoming data. The clock I is fed to one input of gate 10 whose output is connected to the input of an associated shift register. The output signals of the flipflops are each fed with the aid of the same clock to a shift register 9 associated with the respective flipflop. The clock signal clock I steps forward the information in the shift register, which consists of 30 stages for example. The stepping forward is stopped when the information has reached a given stage, the twentieth one of the example. This is obtained by the 1-signal from the last stage of the shift register inhibiting gate 10 and thus preventing loading of the register. When the stepping forward in all shift registers has been stopped, the values from the last stages of the shift registers are read by clock II at a lower rate than that of the input, e.g. at 10 MHz, with the aid of parallel-to-serial converter 11 which unit increments a counter 12 for each read-out "one".

If the condition is made that a received signal is to be regarded as a "one" if 6 of the 10 signals obtained from the delay line are a "one", the numeral 6 is set into a register 13. The values in the counter 12 and register 13 are compared in a comparator 14, and when there is agreement an output signal from the comparator 14 is obtained as a sign that a one has been received. At the end of a bit time, a clearing pulse from sync generator 6 initializes the registers, inverter and counter preparation to the reception of the next bit. The process is repeated a number of times corresponding to the number of bits in the packet, or alternatively the reconstruction of the sync bit at low speed is utilized for obtaining a correct clock phase and register associated with this phase.

What is claimed is:

1. Apparatus for detecting the binary value of pulse shaped signals comprising a delay line for receiving the pulse shaped signals, said delay line having P equispaced taps; P shift registers each having an input connected to a different one of said taps, a stepping input and output; a clock pulse source for generating clock pulses; P control means each connected to said clock pulse source and to the stepping input of a different one of said shift registers for controlling the passage of the clock pulses to said stepping input of said different one of said shift registers; a plurality of means, each of said means being responsive to the presence of a one-bit at the output of a different shift register for activating the control means associated with the shift register; and sampling means having P inputs connected respectively to the outputs of said P shift registers for giving an indication of a particular binary value when more than a predetermined number of outputs of said P shift registers show a one-bit value.

2. The apparatus of claim 1 wherein said sampling means comprises counting means of counting the number of one-bits at the outputs of said P shift registers, a register means for storing a predetermined count number, and comparator means having first and second compare inputs connected to said counter means and said register means respectively and an output for giving an indication that a pulse shaped signal has a given binary value when the accumulated count in said counter means is greater than the count number stored in said register means.

3. The apparatus of claim 2 wherein said counting means comprises a parallel/serial converter having P parallel inputs and a serial output and stepped at a given rate and counting means connected to the serial output of said parallel/serial converter.

4. Apparatus for detecting the binary value of pulse shaped signals having a bit rate N comprising: a delay line for receiving the pulse shaped signals, said delay line having P equispaced taps; P shift registers each having an input connected to a different one of said taps, a stepping input and an output; a first clock pulse source for generating first clock pulses at said bit rate N; P control means each connected to said first clock pulse source and to the stepping input of a different one of said shift registers for controlling the passage of first clock pulses to said stepping input of said different one of said shift registers; a plurality of means, each of said means being responsive to the presence of a one-bit at the output of a different shift register for activating the control means associated with the shift register a parallel/serial converter having P inputs, each connected to the output of a different shift register, a stepping input and an output; a second clock pulse source for generating second clock pulses at a bit rate less than N, said second clock pulse means connected to the stepping input of said parallel/serial converter; a counter means connected to the output of said parallel/serial converter for counting one-bits stored therein; a register means for storing a predetermined count number and comparator means having first and second compare inputs connected to said counter means and said register means respectively and an output for giving an indication that a pulse shaped signal has a given binary value when the accumulated count in said means is greater than the count number stored in said register.

* * * * *